US012731431B2

(12) United States Patent
Liu et al.

(10) Patent No.: US 12,731,431 B2
(45) Date of Patent: Sep. 8, 2026

(54) IMAGE PROCESSING METHOD, IMAGE PROCESSING APPARATUS, ELECTRONIC DEVICE, AND COMPUTER-READABLE STORAGE MEDIUM

(71) Applicant: ZTE CORPORATION, Shenzhen (CN)

(72) Inventors: Shaoli Liu, Shenzhen (CN); Diankai Zhang, Shenzhen (CN); Bofei Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 431 days.

(21) Appl. No.: 18/038,431

(22) PCT Filed: Nov. 10, 2021

(86) PCT No.: PCT/CN2021/129833
§ 371 (c)(1),
(2) Date: May 23, 2023

(87) PCT Pub. No.: WO2022/105655
PCT Pub. Date: May 27, 2022

(65) Prior Publication Data
US 2024/0013573 A1 Jan. 11, 2024

(30) Foreign Application Priority Data
Nov. 23, 2020 (CN) ......................... 202011320552.2

(51) Int. Cl.
*G06V 40/16* (2022.01)
*G06V 10/24* (2022.01)
(Continued)

(52) U.S. Cl.
CPC ............ *G06V 40/165* (2022.01); *G06V 10/24* (2022.01); *G06V 10/761* (2022.01); *G06V 10/7715* (2022.01); *G06V 40/171* (2022.01)

(58) Field of Classification Search
CPC .......... G06F 18/22; G06N 3/045; G06N 3/09; G06N 3/08; G06N 3/0464; G06N 3/04;
(Continued)

(56) References Cited

U.S. PATENT DOCUMENTS

2022/0318541 A1* 10/2022 Dai .................... G02B 27/0172

FOREIGN PATENT DOCUMENTS

CN 108364023 A * 8/2018 ............. G06V 10/82
CN 110046598 A * 7/2019 ............. G06N 3/045
(Continued)

OTHER PUBLICATIONS

Salient object detection based on bidirectional message link convolution neural network. Shen et al. (Year: 2019).*
(Continued)

*Primary Examiner* — Delomia L Gilliard
(74) *Attorney, Agent, or Firm* — Li & Cai Intellectual Property (USA) Office

(57) ABSTRACT

The present application provides an image processing method, an image processing apparatus, an electronic device, and a computer-readable storage medium. The image processing method includes: pre-processing an image to be detected to obtain an input feature map; performing multi-channel processing on the input feature map to obtain a channel attention feature map; processing spatial domain information in the channel attention feature map to obtain a spatial attention weight; and determining an output feature map according to the spatial attention weight and the channel attention feature map.

15 Claims, 4 Drawing Sheets

(51) Int. Cl.
*G06V 10/74* (2022.01)
*G06V 10/77* (2022.01)

(58) Field of Classification Search
CPC .... G06V 10/82; G06V 40/172; G06V 10/454; G06V 40/171; G06V 10/7715; G06V 10/761; G06V 10/24; G06V 40/165
See application file for complete search history.

(56) References Cited

FOREIGN PATENT DOCUMENTS

| | | | | |
|---|---|---|---|---|
| CN | 110516583 | A | 11/2019 | |
| CN | 111178183 | A * | 5/2020 | ........... G06V 40/172 |
| WO | WO2015040450 | A1 | 3/2015 | |
| WO | WO20200222985 | A1 | 11/2020 | |

OTHER PUBLICATIONS

Multi-Attention Object Detection Model in Remote Sensing Images Based on Multi-Scale. Ying et al. (Year: 2019).*
Pooling Methods in Deep Neural Networks, a Review. Gholamalinezhad et al. (Year: 2020).*
WIPO, International Search Report issued on Feb. 10, 2022.
Kai Sheng, et al., “Salient object detection based on bidirectional message”, CAAI Transactions on Intelligent Systems, vol. 14, No. 6, Nov. 30, 2019.
Indian Patent Office, the first Office action dated Aug. 4, 2025, for corresponding IN application No. 202317038912.

* cited by examiner

IMAGE PROCESSING METHOD, IMAGE PROCESSING APPARATUS, ELECTRONIC DEVICE, AND COMPUTER-READABLE STORAGE MEDIUM

CROSS-REFERENCE TO RELATED APPLICATIONS

This application claims the priority of Chinese patent application No. 202011320552.2 filed on Nov. 23, 2020, the entirety of which is incorporated hereby by reference.

TECHNICAL FIELD

The present application relates to the field of image processing technology, and specifically relates to an image processing method, an image processing apparatus, an electronic device, and a computer-readable storage medium.

BACKGROUND

When viewing an image through eyes, a human being can quickly focus on a target area to be paid attention to and further acquire more detail information of the target area, which is called a visual attention mechanism. The visual attention mechanism can greatly increase the processing efficiency and accuracy of human beings on the obtained information.

In recent years, technicians have proposed an attention module applicable to deep learning by simulating the visual attention mechanism of human beings. During operating, the attention module has poor compatibility with objects of different sizes and objects at different distances in an input image, resulting in an inaccurate output feature map.

SUMMARY

In an aspect, the present application provides an image processing method, including: pre-processing an image to be detected to obtain an input feature map; performing multi-channel processing on the input feature map to obtain a channel attention feature map; processing spatial domain information in the channel attention feature map to obtain a spatial attention weight; and determining an output feature map according to the spatial attention weight and the channel attention feature map.

In an aspect, the present application provides an image processing apparatus, including: a pre-processing module configured to pre-process an image to be detected to obtain an input feature map; a channel attention processing module configured to perform multi-channel processing on the input feature map to obtain a channel attention feature map; a spatial weight determination module configured to process spatial domain information in the channel attention feature map to obtain a spatial attention weight; and a spatial attention processing module configured to determine an output feature map according to the spatial attention weight and the channel attention feature map.

In an aspect, the present application provides an electronic device, including: at least one processor; and a memory having at least one computer program stored thereon, the at least one computer program, executed by the at least one processor, causes the at least one processor to implement the image processing method according to the present application.

In an aspect, the present application provides a computer-readable storage medium having a computer program stored thereon, the computer program, executed by a processor, causes the processor to implement the image processing method according to the present application.

With respect to above and other aspects of the present application and implementations thereof, further description is provided in the brief description of drawings, the detailed description, and the claims.

DETAILED DESCRIPTION

For clarity and better understanding of objects, technical solutions and advantages of the present application, implementations of the present application will be described in detail below in conjunction with the accompanying drawings. It should be noted that the implementations of the present application and features therein may be combined with each other in any manner as long as they are not contradictory.

In recent years, technicians have proposed an attention module applicable to deep learning by simulating the visual attention mechanism of human beings. The attention module can select information beneficial to a current task from an input image, and suppress an influence of information of an interference area on the current task. The attention module includes: a channel domain attention module, a spatial domain attention module, and a hybrid domain attention module. The hybrid domain attention module can obtain attention weights of the input image in a spatial domain and a channel domain. A Convolution Block Attention Module (CBAM), widely applied currently as the hybrid domain attention module, extracts a channel feature map set of a feature map by using a single convolution kernel, but has poor compatibility with objects of different sizes and objects at different distances, resulting in an inaccurate weight map. Moreover, a part of the CBAM, serving as the spatial attention module, is desired to firstly process an input feature map by global maximum pooling and global average pooling to obtain two processed feature maps, and two processed feature maps are then combined and subjected to a convolution operation, which involves a relatively large computation volume and makes the CBAM difficult to be implemented.

Figure 1:
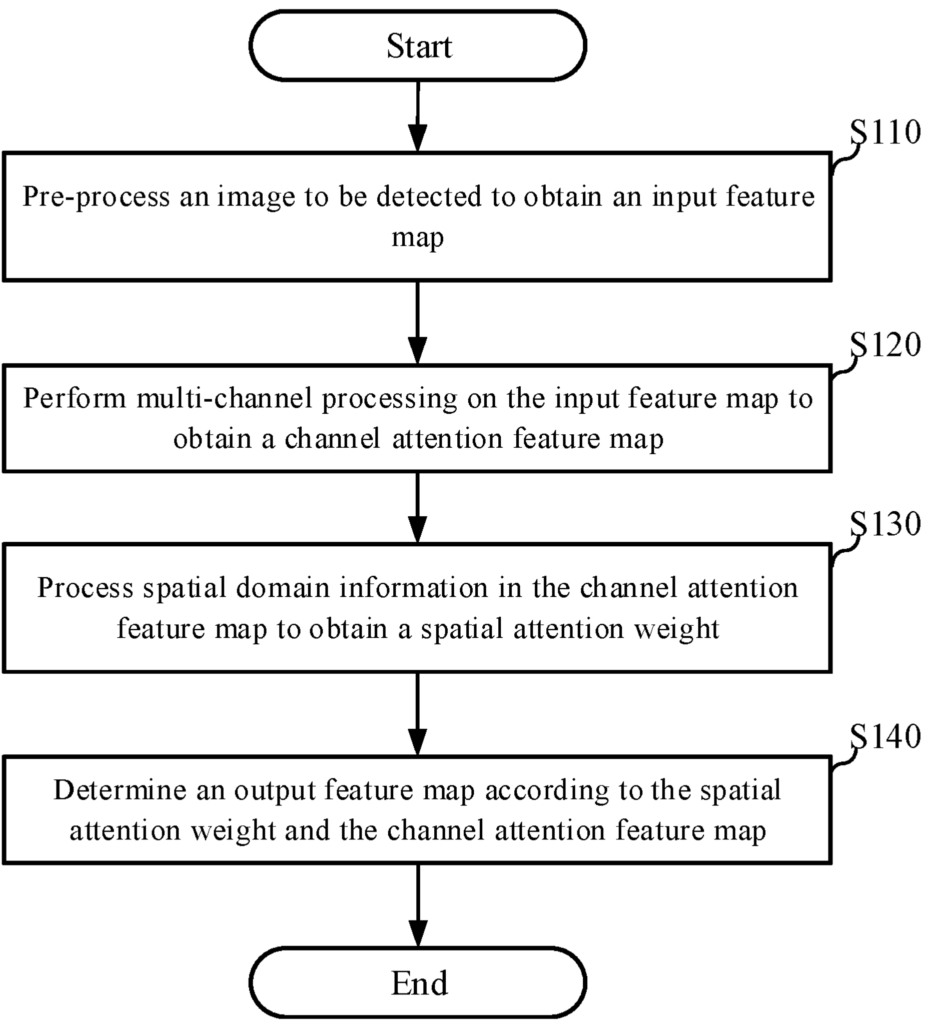
FIG. 1 shows a schematic flowchart of an image processing method according to the present application.

FIG. 1 shows a schematic flowchart of an image processing method according to an embodiment of the present application. The image processing method may be applied to an image processing apparatus which is applicable to a face recognition network. As shown in FIG. 1, the image processing method in the embodiment of the present application may include following operations S110 to S140.

At operation S110, pre-processing an image to be detected to obtain an input feature map.

The image to be detected includes a face image and/or an object image, and is subjected to operations, such as feature extraction, image segmentation, matching, identification, to eliminate unnecessary information in the image to be detected, recover useful real information, enhance detectability of the information, and simplify data to a maximum extent, so that a reliability of the input feature map obtained is improved.

For example, in a case where the image to be detected is a face image, multiple face images in the image to be detected may be detected and aligned, so that images of a same type are closer to each other, and images of different types are further away from each other, thereby facilitating identification of the face images and enabling the same face image to be distinguished as soon as possible.

At operation S120, performing multi-channel processing on the input feature map to obtain a channel attention feature map.

A channel may be understood as a mapping of a selected area. Pixel colors in each channel are composed of a set of brightness values of primary colors. For example, for an RGB image, the pixel color in the R channel is red, the pixel color in the G channel is green, and the pixel color in the B channel is blue. For a CMYK image, the pixel color in the C channel is cyan, the pixel color in the M channel is magenta, the pixel color in the Y channel is yellow, the pixel color in the K channel is black (taking the last letter of black). The types of channels mentioned above are merely exemplary, and may be specifically set according to specific implementations. Other types of channels that are not described herein also fall within the protection scope of the present application, and are not described in detail here. The channel attention feature map is a feature map corresponding to the channel with the greatest importance degree in a plurality of channels after the input feature map is input to the plurality of channels for processing.

For example, the input feature map may be input into any one or more of the R channel, the G channel or the B channel for processing. Due to different processing dimensions of different channels on the input feature map, the obtained channel attention feature map can reflect more features more comprehensively, thereby ensuring the accuracy of feature extraction on the input feature map.

At operation S130, processing spatial domain information in the channel attention feature map to obtain a spatial attention weight.

The spatial domain information may include any one or more of spectral domain information, neighborhood information of a spatial domain, or edge information. For example, a related support vector machine is adopted to classify hyperspectral images on the basis of the spectral domain information; a classification result is optimized in combination with the neighborhood information of the spatial domain; and targets in the channel attention feature map are classified using the edge information. The spatial domain information may also be height information of the channel attention feature map and/or width information of the channel attention feature map, or the like, so that information of different spatial dimensions in the channel attention feature map can be extracted quickly, and the spatial attention weight can be reflected. The spatial domain information mentioned above is merely exemplary, and may be specifically set according to specific implementations. Other types of spatial domain information that are not described herein also fall within the protection scope of the present application, and are not described in detail here.

The spatial attention weight is a proportion of each target to be detected (for example, an image of a face, a tree, an animal or the like) in the channel attention feature map in a two-dimensional space, which can reflect an importance degree of the target to be detected in the two-dimensional space of the channel attention feature map, so as to determine which target gets the main attention of a user, and increase a detection weight of the most important target to enable the target to be detected to be more notable, which facilitates the subsequent processing, and thus the output feature map can be quickly obtained.

In some implementations, the processing spatial domain information in the channel attention feature map to obtain the spatial attention weight includes: performing maximum pooling on the spatial domain information in the channel attention feature map by taking each channel as a unit, to obtain a pooled feature map which includes a two-dimensional feature vector; and performing convolution operation on the pooled feature map corresponding to each channel to determine the spatial attention weight.

The performing convolution operation on the pooled feature map corresponding to each channel may include performing convolution operation on the pooled feature map corresponding to each channel by using a 1*1 convolution kernel, to obtain the spatial attention weight.

For example, the two-dimensional feature vector may be a feature vector of H*W, where H represents a height of the pooled feature map, and W represents a width of the pooled feature map. The two-dimensional feature vector can reflect importance degrees of spatial attention of the pooled feature map in different channels, and the spatial attention in the most important channel can be determined by comparing spatial attentions in different channels, so as to determine the spatial attention weight. The two-dimensional feature vector enables spatial features of the input feature map to be reflected, ensures comprehensiveness and integrity of channel features and the spatial features of the input feature map, and facilitates subsequent processing the input feature map.

At operation S140, determining an output feature map according to the spatial attention weight and the channel attention feature map.

The output feature map is configured to characterize the most notable feature of attention, i.e., a feature that can be reflected by each of a channel attention and a spatial attention. For example, the spatial attention weight and the channel attention feature map may be subjected to dot product operation to obtain an output feature map, so that the operation volume is reduced, the spatial features in the channel attention feature map can be quickly extracted, and the output feature map can more comprehensively reflect the spatial features and the channel features, and the comprehensiveness and accuracy of the features are ensured.

In some implementations, the determining the output feature map according to the spatial attention weight and the channel attention feature map includes: performing dot product operation on the spatial attention weight and the channel attention feature map, to obtain the output feature map.

By performing dot product operation on the channel attention feature map and the spatial attention weight, the spatial domain information of the channel attention feature map can be considered on the basis of the channel attention feature map, and in combination with the channel features and the spatial features, the features of the output feature map can be more comprehensive and more accurate.

In this embodiment, by performing multi-channel processing on the input feature map to obtain the channel attention feature map, and processing spatial domain information in the channel attention feature map to obtain the spatial attention weight, features to be expressed by the input feature map are enhanced in channel and space dimensions, and the most distinguishable visual feature in the input feature map is highlighted; and by determining the output feature map according to the spatial attention weight and the channel attention feature map, the processed output feature map can be more accurate, the image classification precision is improved, the accuracy in target detection is ensured, and the application in the field of machine vision is facilitated.

In some implementations, the performing multi-channel processing on the input feature map to obtain the channel attention feature map in the operation S120 includes: performing global average pooling on the input feature map to obtain a feature map to be detected; determining the channel attention feature map according to N channel convolution kernels and the feature map to be detected, where the N channel convolution kernels are different in scale, and N is an integer greater than or equal to 1.

For example, the convolution operation is performed on the respective channel convolution kernels with three different sizes of 1*1, 3*3 and 5*5 and the feature map to be detected, to obtain three different channel attention feature maps. Due to different receptive fields of the channel convolution kernels with different sizes, different feature extraction effects may be achieved for targets with different scales (for example, at different distances or with different sizes). As a result, a feature range of the feature map to be detected is expanded, so that features of the feature map to be detected can be reflected more comprehensively as soon as possible, images in the feature map to be detected can be processed conveniently, and channel attention feature maps at different angles can be obtained more quickly, thereby the attention of a user can be reflected more comprehensively and accurately through features of the channel attention feature maps obtained.

In some implementations, the determining the channel attention feature map according to the N channel convolution kernels and the feature map to be detected includes: performing operation on the N channel convolution kernels and the feature map to be detected respectively to obtain N channel feature maps; performing image equalization on the N channel feature maps, and determining an equalized channel feature map which includes a one-dimensional feature vector; and determining the channel attention feature map according to the equalized channel feature map and the input feature map.

For example, the one-dimensional feature vector may be a feature vector of 1*1*C, where C represents the number of feature channels, which reflects channel features of the equalized channel feature map. Then, the channel attention feature map is obtained according to the equalized channel feature map and the input feature map (for example, the equalized channel feature map and the input feature map are subjected to processing such as feature fusion), so that the channel features of the feature map to be detected can be more notable, and the channel attention is improved.

In some implementations, the determining the channel attention feature map according to the equalized channel feature map and the input feature map includes: performing dot product operation on the equalized channel feature map and the feature map to be detected to obtain the channel attention feature map.

By performing dot product operation on the equalized channel feature map and the feature map to be detected, the operation volume is greatly reduced, the channel attention feature map can be obtained more quickly, and the subsequent processing on the input feature map is facilitated.

Figure 2:
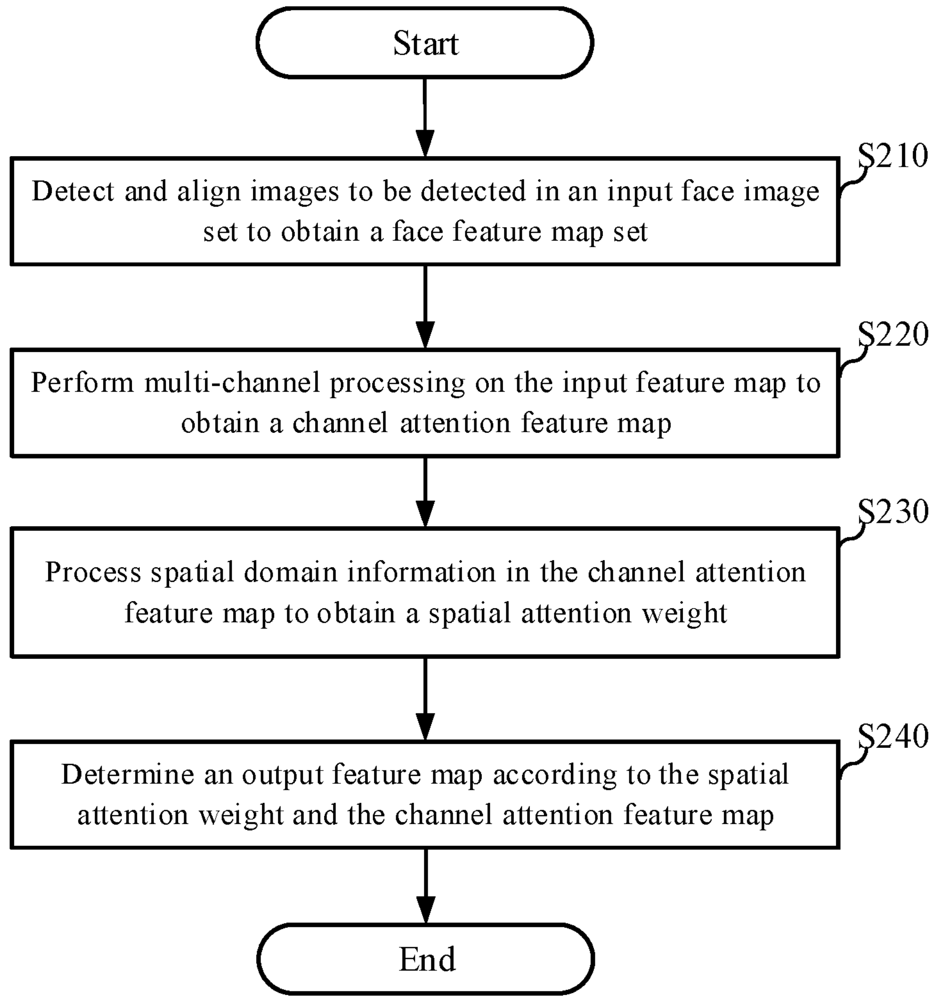
FIG. 2 shows another schematic flowchart of an image processing method according to the present application.

FIG. 2 shows another schematic flowchart of an image processing method according to an embodiment of the present application. The image processing method may be applied to an image processing apparatus which is applicable to a face recognition network. As shown in FIG. 2, the image processing method in the embodiment of the present application may include following operations S210 to S240.

At operation S210, detecting and aligning images to be detected in an input face image set to obtain a face feature map set.

The face image set includes a first image to be detected and a second image to be detected, and the face feature map set includes a first face feature map and a second face feature map.

For example, each of the first face feature map and the second face feature map may be used as the input feature map, and the first face feature map and the second face feature map are detected and aligned, including calibrating five points of eyes, a nose tip and mouth corners on each of faces in such two face feature maps to the same positions respectively (i.e., the five points of the eyes, the nose tip and the mouth corners on the face in the first face feature map are consistent with the five points of the eyes, the nose tip and the mouth corners on the face in the second face feature map), so as to eliminate the influence of head angles and face sizes on face recognition. Thereby, feature screening on the two face feature maps can be performed more clearly, and thus differences between the two face feature maps can be distinguished quickly.

At operation S220, performing multi-channel processing on the input feature map to obtain a channel attention feature map.

The input feature map may be a first face feature map in the face feature map set, or a second face feature map in the face feature map set. In some implementations, the face feature map set may include N face feature maps, where N is an integer greater than or equal to 2.

By processing the input feature map with multiple channels, multi-dimensional image features can be obtained, and feature extraction on the input feature map can be facilitated. Due to different processing dimensions of the channels on the input feature map, the obtained channel attention feature map can reflect more features more comprehensively, thereby ensuring the accuracy of feature extraction on the input feature map.

At operation S230, processing spatial domain information in the channel attention feature map to obtain a spatial attention weight.

At operation S240, determining an output feature map according to the spatial attention weight and the channel attention feature map.

It should be noted that operations S230 and S240 in this embodiment are the same as operations S130 and S140 in the previous embodiment, respectively, and thus are not repeated here.

In this embodiment, by detecting and aligning images to be detected in an input face image set, i.e., by calibrating five points of eyes, a nose tip and mouth corners on each of faces in face feature maps to the same positions respectively (for example, calibrating two points of the left and right eyes, one point of the nose tip and the left and right mouth corners on each of the faces in the face feature maps to the same positions respectively), the influence of head angles and face sizes on image recognition is eliminated, and extraction of face features is facilitated. Then, by performing multi-channel processing on each input feature map in the obtained face feature map set, the channel attention feature map is obtained, and channel features of each input feature map are extracted. Then, by processing spatial domain information in the channel attention feature map to obtain the spatial attention weight, spatial features of each input feature map are reflected, and the most distinguishable visual feature in the input feature map is highlighted through the channel features and the spatial features. By determining the output feature map according to the spatial attention weight and the channel attention feature map, the processed output feature map can be more accurate, the image classification precision is improved, and the accuracy in target detection is ensured.

In some implementations, after determining the output feature map according to the spatial attention weight and the channel attention feature map, the image processing method further includes: calculating a matching similarity between a first output feature map corresponding to the first face feature map and a second output feature map corresponding to the second face feature map; and determining, according to the matching similarity and a preset similarity threshold, whether the first image to be detected and the second image to be detected are the same or not.

For example, the preset similarity threshold is set to 0.5, and in a case where the matching similarity of the first output feature map and the second output feature map is less than 0.5, it is determined that the first image to be detected is different from the second image to be detected; and in a case where the matching similarity of the first output feature map and the second output feature map is greater than or equal to 0.5, it is determined that the first image to be detected is the same as the second image to be detected. By the aid of the above determination method, the first image to be detected and the second image to be detected can be distinguished quickly, the image processing speed can be increased, and the user experience can be improved.

In some implementations, the calculating the matching similarity between the first output feature map corresponding to the first face feature map and the second output feature map corresponding to the second face feature map includes: calculating, according to n feature vectors in the first output feature map and n feature vectors in the second output feature map, a cosine similarity between the first output feature map and the second output feature map, where n is an integer greater than or equal to 1.

For example, the cosine similarity may be calculated by:

$$S = \frac{\sum_{i=1}^{n}(x_i \times y_i)}{\sqrt{\sum_{i=1}^{n}(x_i)^2} \times \sqrt{\sum_{i=1}^{n}(y_i)^2}},$$

where S represents the cosine similarity, i represents a serial number of a feature vector in the output feature map, $i=\{1,2, \ldots ,n\}$ , $x_i$ represents an $i^{th}$ feature vector in the first output feature map, $y_i$ represents an $i^{th}$ feature vector in the second output feature map, n represents a dimension of the feature, and n is an integer greater than or equal to 1.

Whether the first output feature map and the second output feature map are the same is determined according to the cosine similarity, and then whether the first face feature map is the same as the second face feature map is determined, so as to determine whether the first image to be detected and the second image to be detected are the same or not. In such way, the speed of distinguishing faces is increased, different face features can be rapidly recognized, face images can be distinguished more quickly, and the application in the field of machine vision is facilitated.

Figure 3:
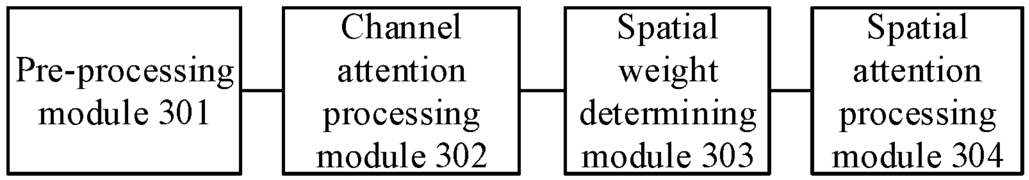
FIG. 3 shows a schematic structural diagram of an image processing apparatus according to the present application.

The image processing apparatus according to an embodiment of the present application will be described in detail below in combination with the FIGS. 3 and 4. FIG. 3 shows a schematic structural diagram of an image processing apparatus according to an embodiment of the present application. As shown in FIG. 3, the image processing apparatus may include a pre-processing module 301, a channel attention processing module 302, a spatial weight determination module 303, and a spatial attention processing module 304.

The pre-processing module 301 is configured to pre-process an image to be detected to obtain an input feature map; the channel attention processing module 302 is configured to perform multi-channel processing on the input feature map to obtain a channel attention feature map; the spatial weight determination module 303 is configured to process spatial domain information in the channel attention feature map to obtain a spatial attention weight; and the spatial attention processing module 304 is configured to determine an output feature map according to the spatial attention weight and the channel attention feature map.

In this embodiment, by the channel attention processing module 302 performing multi-channel processing on the input feature map to obtain the channel attention feature map, and the spatial weight determination module 303 processing spatial domain information in the channel attention feature map to obtain the spatial attention weight, features to be expressed by the input feature map are enhanced in channel and space dimensions, and the most distinguishable visual feature in the input feature map is highlighted; and by the spatial attention processing module 304 determining the output feature map according to the spatial attention weight and the channel attention feature map, the processed output feature map can be more accurate, the image classification precision is improved, the accuracy in target detection is ensured, and the application in the field of machine vision is facilitated.

Figure 4:
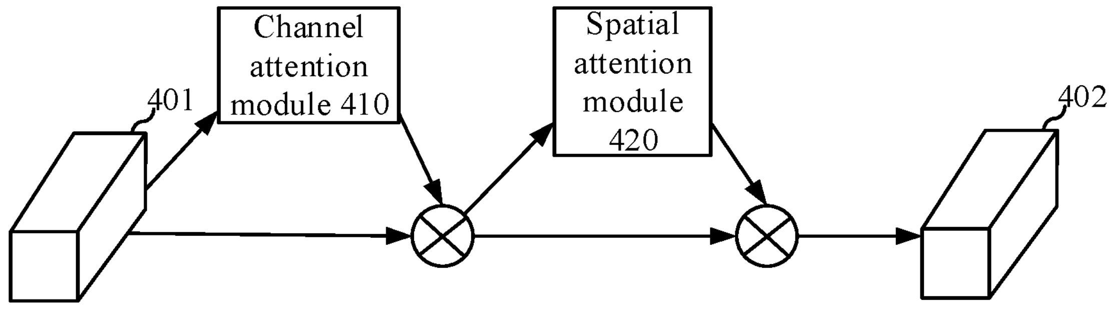
FIG. 4 shows another schematic structural diagram of an image processing apparatus according to the present application.

FIG. 4 shows another schematic structural diagram of an image processing apparatus according to an embodiment of the present application. As shown in FIG. 4, the image processing apparatus may be implemented as a multiple kernel attention (MKA) module, and may include: a channel attention module 410 and a spatial attention module 420. In FIG. 4, each of an input feature map 401 and an output feature map 402 is a multi-dimensional feature map. For example, the input feature map 401 is a three-dimensional feature map with a dimension of H*W*C, and the output feature map 402 is also a three-dimensional feature map with a dimension of H*W*C.

For example, the input feature map 401 is input into the channel attention module 410 for processing, the input feature map 401 is processed through multiple channels (for example, an R channel, a G channel, and a B channel, etc.), and is assigned with a channel attention weight by screening. The channel attention weight is a weight of the most important channel among all channels. Less important channels are suppressed, and the channel attention weight is subjected to dot product operation with the input feature map 401 to obtain a channel attention feature map. Then, the channel attention feature map is input into the spatial attention module 420 for processing. For example, corresponding spatial transformation is performed on spatial domain information in the channel attention feature map, to obtain a spatial attention weight, and then the spatial attention weight and the channel attention feature map are subjected to dot product operation to obtain the output feature map 402.

By processing the input feature map 401 through the channel attention module 410 and the spatial attention module 420 sequentially, features to be expressed by the input feature map 401 are enhanced in channel and space dimensions, and the most distinguishable visual feature in the input feature map 401 is highlighted, so that the processed output feature map 402 can be more accurate, and the image classification precision is improved.

Figure 5:
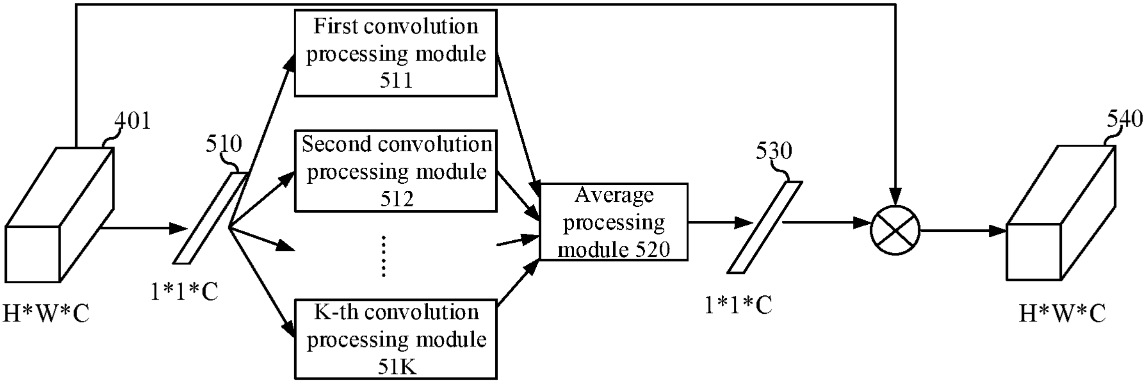
FIG. 5 shows a schematic flowchart of processing an input feature map by a channel attention module in the present application.

FIG. 5 shows a schematic flowchart of processing an input feature map by a channel attention module in an embodiment of the present application. As shown in FIG. 5, the input feature map 401 is processed through following operations to obtain a channel attention feature map 540.

First, the channel attention module 410 performs global average pooling on the input feature map 401 to obtain a feature map 510 to be detected with a size of 1*1*C, where C represents the number of feature channels. By performing global average pooling on the input feature map 401, the calculation volume can be reduced.

Then, modules such as a first convolution processing module 511, a second convolution processing module 512, . . . , a $k^{th}$ convolution processing module 51K are respectively used for processing on the feature map 510 to be detected, where convolution kernels with different sizes are used in the convolution processing modules, and K is an integer greater than or equal to 1. For example, following three convolution kernels with different sizes of 1*1, 3*3 and 5*5 are respectively used for processing on the feature map 510 to be detected (e.g., performing convolution operation on each convolution kernel and the feature map 510 to be detected), resulting in three channel feature maps. Due to different receptive fields of the convolution kernels with different sizes, different feature extraction effects may be achieved for targets with different scales (for example, at different distances or with different sizes). Therefore, by processing the feature map 510 to be detected with multiple convolution kernels, the extracted features can be more comprehensive and more accurate, and in practical applications, the number and sizes of convolution kernels in the convolution processing modules can be flexibly adjusted.

The K channel feature maps obtained are then input into an average processing module 520 for processing, to generate an equalized channel feature map 530, that is, a final channel feature map 530, which includes a one-dimensional feature vector (for example, the equalized channel feature map 530 has a size of 1*1*C), and the equalized channel feature map 530 can represent the importance degree of information of each channel. Finally, the input feature map 401 and the equalized channel feature map 530 are subjected to dot product operation to generate a channel attention feature map 540.

In this embodiment, the input feature map 401 is converted into the feature map 510 to be detected through global average pooling. The feature map 510 to be detected is processed by K convolution kernels with different sizes, so that the receptive field of the feature map 510 to be detected is enlarged, and the extracted features are more comprehensive and more accurate. Then, the obtained K channel feature maps are subjected to equalization to characterize the importance degrees of information of respective channels. Finally, the channel attention feature map 540 is determined according to the input feature map 401 and the equalized channel feature map 530, where the most distinguishable visual feature in the input feature map 401 is highlighted, so that the obtained channel attention feature map 540 can further highlight features of the input feature map 401, and a user can be ensured to quickly capture the visual features of the input feature map 401.

Figure 6:
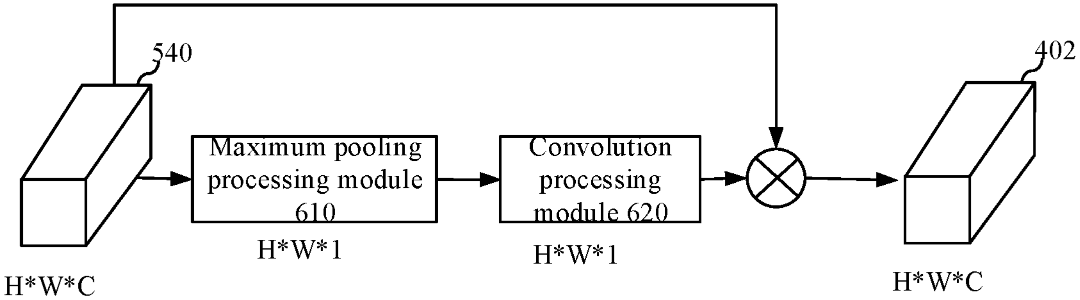
FIG. 6 shows a schematic flowchart of processing a channel attention feature map by a spatial attention module in the present application.

FIG. 6 shows a schematic flowchart of processing a channel attention feature map by a spatial attention module in an embodiment of the present application. As shown in FIG. 6, the channel attention feature map 540 is processed by a maximum pooling processing module 610 and a convolution processing module 620 to obtain the output feature map 402.

First, the channel attention feature map 540 is input into the maximum pooling processing module 610, and subjected to maximum pooling, by taking each channel as a unit, to obtain a pooled feature map. The pooled feature map has a size of H*W*1, where H represents a height of the pooled feature map, and W represents a width of the pooled feature map. By performing maximum pooling on the channel attention feature map 540, the subsequent calculation volume can be reduced.

Then, the maximum pooling processing module 610 outputs the pooled feature map to the convolution processing module 620 for processing, and through processing of the convolution processing module 620, the spatial attention weight can be obtained. For example, the pooled feature map may be subjected to 1*1 convolution processing, so that a dimension of the pooled feature map remains to be H*W*1, to reflect spatial features of the input feature map 401, i.e., the spatial attention weight. The spatial attention weight is then subjected to dot product operation with the channel attention feature map 540 to generate the output feature map 402.

In this embodiment, by the maximum pooling processing module 610 performing maximum pooling on the channel attention feature map 540, by taking each channel as a unit, and outputting the pooled feature map to the convolution processing module 620 for processing, the spatial attention weight that can reflect spatial features of the input feature map 401 is obtained. Then, the spatial attention weight and the channel attention feature map 540 are subjected to dot product operation to generate the output feature map 402. Therefore, the most distinguishable visual feature in the input feature map 401 is highlighted, so that the processed output feature map 402 can be more accurate, and the image classification precision is improved, and the accuracy in target detection is ensured.

Figure 7:
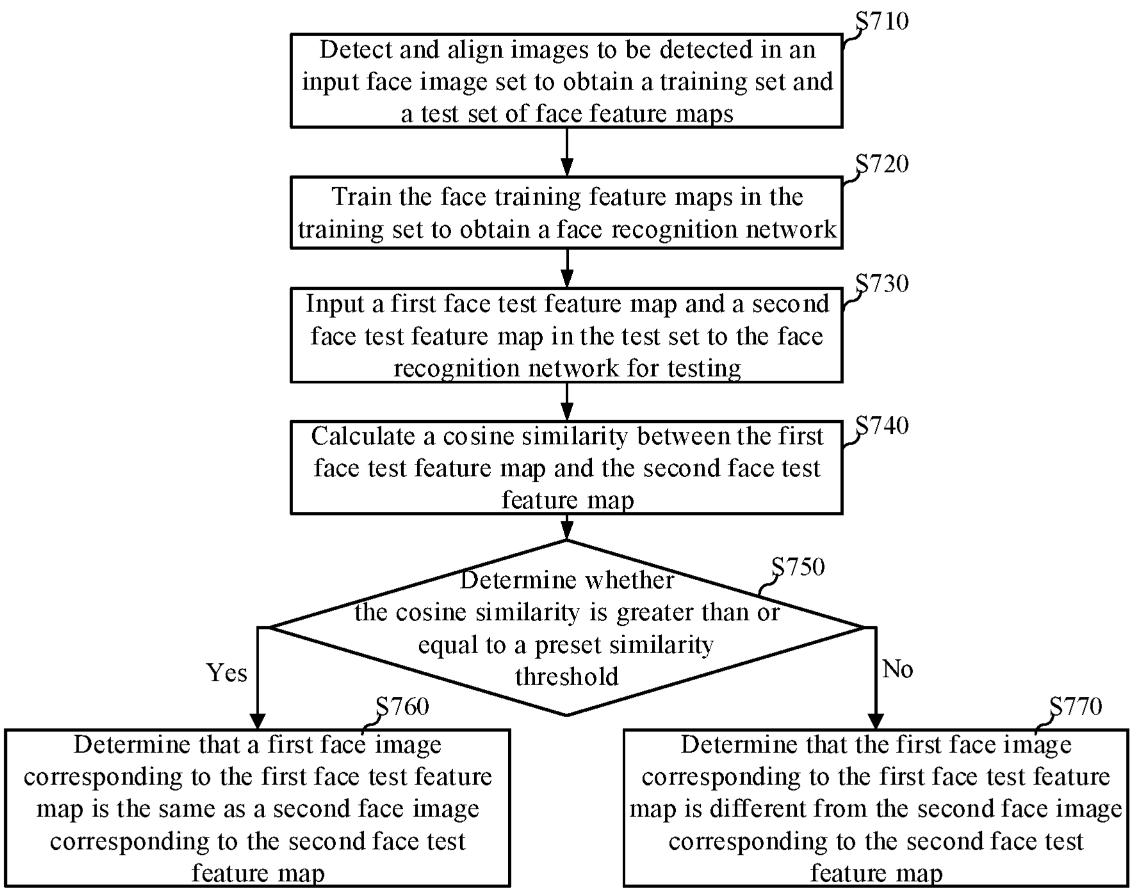
FIG. 7 shows a schematic flowchart of an image processing method for processing a face image based on a channel attention module and a spatial attention module in the present application.

FIG. 7 shows a schematic flowchart of an image processing method for processing a face image based on a channel attention module and a spatial attention module in an embodiment of the present application. The image processing method may be applied to an image processing apparatus which is applicable to a face recognition network. As shown in FIG. 7, the image processing method for processing the face image according to the embodiment of the present application may include following operations S710 to S770.

At operation S710, detecting and aligning images to be detected in an input face image set to obtain a training set and a test set of face feature maps.

For example, a face detection method based on deep learning is used to detect each image to be detected in the input face image set (for example, Retinaface or a multi-task convolutional neural network (MTCNN) is used to detect a face image in each image to be detected), to obtain the training set and the test set. The training set includes face training feature maps, and the test set includes face test feature maps.

Then, the face training feature maps in the training set are aligned. For example, each face image is mapped according to a fixed formula so that five points of eyes, a nose tip, and left and right mouth corners in face images are respectively calibrated to the same positions. Therefore, the influence of head angles and face sizes on face recognition is eliminated, and feature screening on the face training feature map can be performed more clearly, so as to distinguish different face feature maps quickly.

At operation S720, training the face training feature maps in the training set to obtain a face recognition network.

Based on a deep learning (DL) method, the face training feature maps in the training set are trained to obtain the face recognition network. As an intrinsic law of sample data learning, DL has a final goal of enabling a machine to have capabilities of analyzing and learning like a human, and can recognize data such as texts, images and voices.

The face recognition network includes a feature extraction processing module and a classifier. The feature extraction processing module includes an attention module, which may include a channel attention processing module and a spatial attention processing module, so as to extract information, beneficial to face recognition, in the input face feature map and improve the accuracy of face recognition. The classifier is based on a face recognition model (for example, the classifier is determined from a loss function of face recognition), and the classifier can improve a classification capability of the face recognition network, so that images of a same type are closer to each other, and images of different types are further away from each other, thereby facilitating image distinguishing.

At operation S730, inputting a first face test feature map and a second face test feature map in the test set into the face recognition network for testing.

The face recognition network may include an MKA module as shown in FIG. 4. For example, the MKA module is incorporated into an anti-residual module of the face recognition network, so as to improve the expression capability of the face recognition network for face features. By inputting the first face test feature map and the second face test feature map in the test set into the face recognition network for testing, the feature mostly desired to be expressed in the first face test feature map and the feature mostly desired to be expressed in the second face test feature map can be obtained, so that distinguishing features between the first face test feature map and the second face test feature map are more notable, which can facilitate subsequent image comparison as well as rapid image recognition.

At operation S740, calculating a cosine similarity between the first face test feature map and the second face test feature map.

For example, the cosine similarity is calculated by:

$$S = \frac{\sum_{i=1}^{n} (x_i \times y_i)}{\sqrt{\sum_{i=1}^{n} (x_i)^2} \times \sqrt{\sum_{i=1}^{n} (y_i)^2}},$$

where S represents the cosine similarity, i represents a serial number of a feature vector in the output feature map, $i=\{1,2, \ldots ,n\}$ , $x_i$ represents an $i^{th}$ feature vector in the first face test feature map, $y_i$ represents an $i^{th}$ feature vector in the second face test feature map, n represents a dimension of the feature, and n is an integer greater than or equal to 1. For example, n=512.

By characterizing the distinguishing features between the first face test feature map and the second face test feature map with the cosine similarity, the feature distinguishing points can be parameterized, so that the similarity between the distinguishing features can be determined more quickly, and whether the two images are the same or not can be determined as soon as possible.

At operation S750, determining whether the cosine similarity is greater than or equal to a preset similarity threshold.

For example, the preset similarity threshold is set to 0.5, and in a case where the cosine similarity is determined to be greater than or equal to 0.5, operation S760 is performed; and in a case where the cosine similarity is determined to be less than 0.5, operation S770 is performed.

At operation S760, determining that a first face image corresponding to the first face test feature map is the same as a second face image corresponding to the second face test feature map.

At operation S770, determining that the first face image corresponding to the first face test feature map is different from the second face image corresponding to the second face test feature map.

In this embodiment, by detecting and aligning images to be detected in the input face image set, the training set and the test set of face feature maps are obtained, then, the face training feature maps in the training set are trained to obtain the face recognition network that includes the MKA module, so that the features to be expressed by the face feature map are enhanced in channel and space dimensions, and the most distinguishable visual feature in the face feature map is highlighted; the first face test feature map and the second face test feature map are input into the face recognition network for testing, so that the feature mostly desired to be expressed in the first face test feature map and the feature mostly desired to be expressed in the second face test feature map are obtained; the cosine similarity between the first face test feature map and the second face test feature map is calculated, and whether the first face image corresponding to the first face test feature map is the same as the second face image corresponding to the second face test feature map is determined by determining whether the cosine similarity is greater than or equal to a preset similarity threshold, so that the output feature map of the face recognition network can be more accurate, the image classification precision is improved, and the accuracy of face recognition is ensured.

It should be noted that the present application is not limited to the specific configurations and processing described in the above embodiments and shown in the figures. For convenience and simplicity of description, detailed description of any known method is omitted here, and for the specific working processes of the system, the modules and the units described above, reference may be made to corresponding processes in the foregoing method embodiments, which are not described again here.

Figure 8:
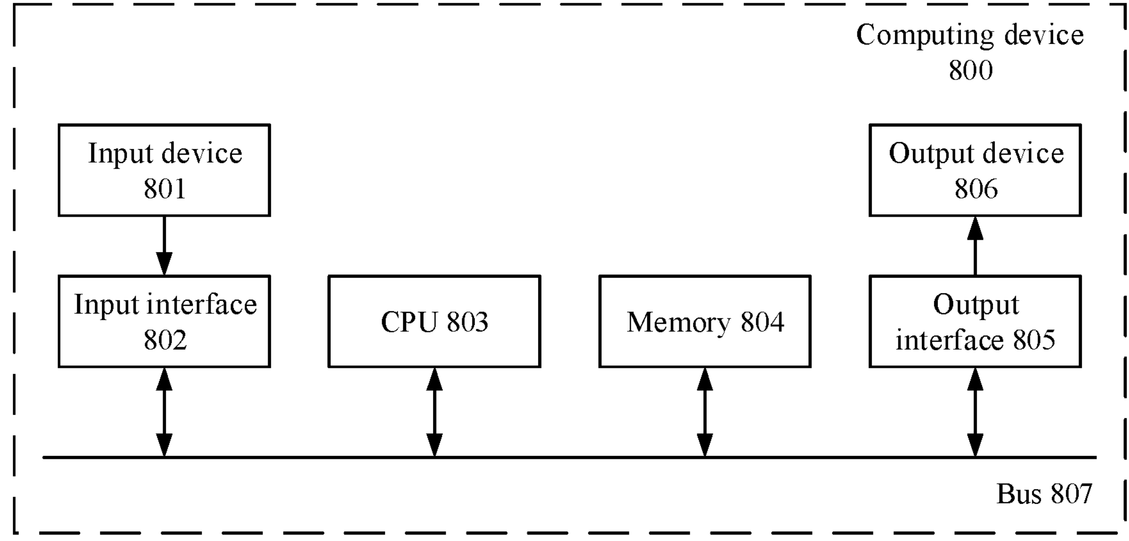
FIG. 8 is a block diagram illustrating an exemplary hardware architecture of a computing device capable of implementing an image processing method and an image processing apparatus according to the present application.

FIG. 8 is a block diagram illustrating an exemplary hardware architecture of a computing device capable of implementing an image processing method and an image processing apparatus according to embodiments of the present application.

As shown in FIG. 8, the computing device 800 includes an input device 801, an input interface 802, a central processing unit 803, a memory 804, an output interface 805, an output device 806 and a bus 807. The input interface 802, the central processing unit 803, the memory 804, and the output interface 805 are interconnected via the bus 807, and the input device 801 and the output device 806 are connected to the bus 807 via the input interface 802 and the output interface 805, respectively, and further connected to other components of the computing device 800.

Specifically, the input device 801 receives input information from outside, and transmit the input information to the central processing unit 803 through the input interface 802; the central processing unit 803 processes the input information based on computer-executable instructions stored in the memory 804 to generate output information, stores the output information temporarily or permanently in the memory 804, and then transmits the output information to the output device 806 through the output interface 805; and the output device 806 outputs output information to external of the computing device 800 to be used by a user.

In some implementations, the computing device shown in FIG. 8 may be implemented as an electronic device including at least: a memory configured to store a computer program; and a processor configured to execute the computer program stored on the memory to implement the image processing method described in any of the above embodiments.

In some implementations, the computing device shown in FIG. 8 may be implemented as an image processing system including at least: a memory configured to store a computer program; and a processor configured to execute the computer program stored on the memory to implement the image processing method described in any of the above embodiments.

An embodiment of the present application further provides a computer-readable storage medium having a computer program stored thereon, the computer program, executed by a processor, causes the processor to implement the image processing method described in any of the above embodiments.

According to the image processing method, the image processing apparatus, the electronic device and the computer-readable storage medium in the embodiments of the present application, by performing multi-channel processing on the input feature map to obtain the channel attention feature map, and processing spatial domain information in the channel attention feature map to obtain the spatial attention weight, features to be expressed by the input feature map are enhanced in channel and space dimensions, and the most distinguishable visual feature in the input feature map is highlighted; and by determining the output feature map according to the spatial attention weight and the channel attention feature map, the output feature map can be more accurate, the image classification precision is improved, the accuracy in target detection is ensured, and the application in the field of machine vision is facilitated.

The above are merely exemplary embodiments of the present application and not intended to limit the scope of the present application. In general, the various embodiments of the present application may be implemented in hardware or special purpose circuits, software, logic or any combination thereof. For example, some aspects may be implemented in hardware, and other aspects may be implemented in firmware or software which may be executed by a controller, a microprocessor or any other computing device, although the present application is not limited thereto.

The embodiments of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, micro-codes, firmware instructions, state setting data, or source or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, including, but not limited to, read only memories (ROMs), random access memories (RAMs), optical storage devices or systems (digital versatile discs (DVDs), compact discs (CDs)), or the like. The computer readable medium may include a non-transitory storage medium. The data processor may be of any type suitable to the local technical environment, including, but not limited to, general purpose computers, dedicated computers, microprocessors, digital signal processors (DSPs), application specific integrated circuits (ASICs), field-programmable gate arrays (FGPAs), and processors based on multi-core processor architecture.

The foregoing has provided, by way of exemplary and non-limiting examples, a detailed description of exemplary embodiments of the present application. Various modifications and adaptations to the foregoing embodiments may become apparent to those skilled in the art in view of the accompanying drawings and the appended claims, without departing from the scope of the present application. Accordingly, the proper scope of the present application is to be determined according to the claims.

What is claimed is:

1. An image processing method, comprising:

pre-processing an image to be detected to obtain an input feature map;

performing multi-channel processing on the input feature map to obtain a channel attention feature map;

processing spatial domain information in the channel attention feature map to obtain a spatial attention weight; and determining an output feature map according to the spatial attention weight and the channel attention feature map, wherein the performing multi-channel processing on the input feature map to obtain the channel attention feature map comprises:

performing global average pooling on the input feature map to obtain a feature map to be detected; and determining the channel attention feature map according to N channel convolution kernels and the feature map to be detected, wherein the N channel convolution kernels are different in scale, and N is an integer greater than or equal to 1, wherein the determining the channel attention feature map according to the N channel convolution kernels and the feature map to be detected comprises:

performing operation on the N channel convolution kernels and the feature map to be detected respectively to obtain N channel feature maps;

performing image equalization on the N channel feature maps, and determining an equalized channel feature map comprising a one-dimensional feature vector; and determining the channel attention feature map according to the equalized channel feature map and the input feature map.

2. The method according to claim 1, wherein the determining the channel attention feature map according to the equalized channel feature map and the input feature map comprises:

performing dot product operation on the equalized channel feature map and the feature map to be detected to obtain the channel attention feature map.

3. The method according to claim 2, wherein the image to be detected comprises a face image, and the pre-processing the image to be detected to obtain the input feature map comprises:

detecting and aligning images to be detected in an input face image set to obtain a face feature map set, wherein the face image set comprises a first image to be detected and a second image to be detected, and the face feature map set comprises a first face feature map and a second face feature map.

4. The method according to claim 3, wherein after determining the output feature map according to the spatial attention weight and the channel attention feature map, the method further comprises:

calculating a matching similarity between a first output feature map corresponding to the first face feature map and a second output feature map corresponding to the second face feature map; and determining, according to the matching similarity and a preset similarity threshold, whether the first image to be detected and the second image to be detected are the same or not.

5. The method according to claim 1, wherein the processing spatial domain information in the channel attention feature map to obtain the spatial attention weight comprises:

performing maximum pooling on the spatial domain information in the channel attention feature map by taking each channel as a unit, to obtain a pooled feature map comprising a two-dimensional feature vector; and performing convolution operation on the pooled feature map corresponding to each channel to determine the spatial attention weight.

6. The method according to claim 5, wherein the image to be detected comprises a face image, and the pre-processing the image to be detected to obtain the input feature map comprises:

detecting and aligning images to be detected in an input face image set to obtain a face feature map set, wherein the face image set comprises a first image to be detected and a second image to be detected, and the face feature map set comprises a first face feature map and a second face feature map.

7. The method according to claim 1, wherein the determining the output feature map according to the spatial attention weight and the channel attention feature map comprises:

performing dot product operation on the spatial attention weight and the channel attention feature map, to obtain the output feature map.

8. The method according to claim 7, wherein the image to be detected comprises a face image, and the pre-processing the image to be detected to obtain the input feature map comprises:

detecting and aligning images to be detected in an input face image set to obtain a face feature map set, wherein the face image set comprises a first image to be detected and a second image to be detected, and the face feature map set comprises a first face feature map and a second face feature map.

9. The method according to claim 1, wherein the image to be detected comprises a face image, and the pre-processing the image to be detected to obtain the input feature map comprises:

detecting and aligning images to be detected in an input face image set to obtain a face feature map set, wherein the face image set comprises a first image to be detected and a second image to be detected, and the face feature map set comprises a first face feature map and a second face feature map.

10. The method according to claim 9, wherein after determining the output feature map according to the spatial attention weight and the channel attention feature map, the method further comprises:

calculating a matching similarity between a first output feature map corresponding to the first face feature map and a second output feature map corresponding to the second face feature map; and determining, according to the matching similarity and a preset similarity threshold, whether the first image to be detected and the second image to be detected are the same or not.

11. The method according to claim 10, wherein the calculating the matching similarity between the first output feature map corresponding to the first face feature map and the second output feature map corresponding to the second face feature map comprises:

calculating, according to n feature vectors in the first output feature map and n feature vectors in the second output feature map, a cosine similarity between the first output feature map and the second output feature map, wherein n is an integer greater than or equal to 1.

12. An electronic device, comprising:

at least one processor; and a memory having at least one computer program stored thereon, at least one computer program, executed by the at least one processor, causes the at least one processor to implement the image processing method according to claim 1.

13. A non-transitory computer-readable storage medium having a computer program stored thereon, the at least one computer program, executed by a processor, causes the processor to implement the image processing method according to claim 1.

14. An image processing apparatus, comprising:

a pre-processing module configured to pre-process an image to be detected to obtain an input feature map;

a channel attention processing module configured to perform multi-channel processing on the input feature map to obtain a channel attention feature map;

a spatial weight determination module configured to process spatial domain information in the channel attention feature map to obtain a spatial attention weight; and a spatial attention processing module configured to determine an output feature map according to the spatial attention weight and the channel attention feature map, wherein the channel attention processing module is configured to perform multi-channel processing on the input feature map to obtain the channel attention feature map by:

performing global average pooling on the input feature map to obtain a feature map to be detected; and determining the channel attention feature map according to N channel convolution kernels and the feature map to be detected, wherein the N channel convolution kernels are different in scale, and N is an integer greater than or equal to 1, wherein the channel attention processing module is configured to determine the channel attention feature map according to the N channel convolution kernels and the feature map to be detected by:

performing operation on the N channel convolution kernels and the feature map to be detected respectively to obtain N channel feature maps;

performing image equalization on the N channel feature maps, and determining an equalized channel feature map comprising a one-dimensional feature vector; and determining the channel attention feature map according to the equalized channel feature map and the input feature map.

15. An image processing method, comprising:

pre-processing an image to be detected to obtain an input feature map;

performing multi-channel processing on the input feature map to obtain a channel attention feature map;

processing spatial domain information in the channel attention feature map to obtain a spatial attention weight; and determining an output feature map according to the spatial attention weight and the channel attention feature map, wherein the processing spatial domain information in the channel attention feature map to obtain the spatial attention weight comprises:

performing maximum pooling on the spatial domain information in the channel attention feature map by taking each channel as a unit, to obtain a pooled feature map comprising a two-dimensional feature vector; and performing convolution operation on the pooled feature map corresponding to each channel to determine the spatial attention weight.

* * * * *